(12) United States Patent
Voit et al.

(10) Patent No.: US 12,395,339 B2
(45) Date of Patent: Aug. 19, 2025

(54) FAST REPOWERING USING CRYPTOGRAPHICALLY PROTECTED IDENTITY

(71) Applicant: Cisco Technology, Inc., San Jose, CA (US)

(72) Inventors: Eric A. Voit, Bethesda, MD (US); Yesu Lu, San Jose, CA (US); Eliot Lear, Wetzikon (CH); Ashok K. Moghe, Pleasanton, CA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 176 days.

(21) Appl. No.: 18/452,276

(22) Filed: Aug. 18, 2023

(65) Prior Publication Data

US 2024/0388435 A1  Nov. 21, 2024

Related U.S. Application Data

(60) Provisional application No. 63/502,957, filed on May 18, 2023.

(51) Int. Cl.
*H04L 9/32* (2006.01)
*H04L 9/30* (2006.01)

(52) U.S. Cl.
CPC .............. *H04L 9/3213* (2013.01); *H04L 9/30* (2013.01); *H04L 9/3273* (2013.01); *H04L 9/3297* (2013.01)

(58) Field of Classification Search
CPC ....... H04L 9/3213; H04L 9/30; H04L 9/3273; H04L 9/3297
See application file for complete search history.

(56) References Cited

U.S. PATENT DOCUMENTS 8,918,660 B2 * 12/2014 Santos ................. H04L 49/40
                                                            713/320
9,860,257 B1    1/2018  Kumar et al.
(Continued)

FOREIGN PATENT DOCUMENTS

| CN | 102647282 A | 8/2012 | |
|---|---|---|---|
| CN | 102647283 A | 8/2012 | |
| WO | WO-2023192206 A1 * | 10/2023 | ............. B60L 53/30 |

OTHER PUBLICATIONS

CISCO: "Cisco UPOE+: The Catalyst for Expanded IT-OT Convergence," White Paper, Cisco Public, https://www.cisco.com/c/en/us/solutions/collateral/enterprise-networks/nb-06-upoe-plus-it-ot-wp-cte-en.html, Feb. 2022, 15 pages.
(Continued)

*Primary Examiner* — Darren B Schwartz
(74) *Attorney, Agent, or Firm* — Edell, Shapiro & Finnan, LLC

(57) ABSTRACT

A computing device connected to a power source via a combined power/data connection obtains an authentication request from the power source. The authentication request includes a freshness mechanism provided by the power source. The computing device signs an authentication response with a private key associated with a verified identity stored on the computing device. The authentication response includes the freshness mechanism. The computing device provides the authentication response to the power source, and receives power from the power source.

26 Claims, 6 Drawing Sheets

(56) References Cited

U.S. PATENT DOCUMENTS

| | | | |
|---|---|---|---|
| 11,193,963 B1 | 12/2021 | Sizikov et al. | |
| 11,447,030 B1* | 9/2022 | Palombini | B60L 53/66 |
| 11,977,622 B2* | 5/2024 | Clish | H04L 63/164 |
| 12,238,080 B2* | 2/2025 | Raghunath | H04L 9/321 |
| 2006/0117176 A1* | 6/2006 | Sasaki | H04L 9/3273 |
| | | | 713/155 |
| 2006/0143583 A1 | 6/2006 | Diab et al. | |
| 2007/0157318 A1* | 7/2007 | Lee | G06F 21/10 |
| | | | 726/27 |
| 2008/0256598 A1* | 10/2008 | Diab | H04L 63/08 |
| | | | 726/2 |
| 2010/0017611 A1* | 1/2010 | Tsuboka | G06F 21/445 |
| | | | 713/168 |
| 2010/0199113 A1 | 8/2010 | Lee | |
| 2011/0016342 A1 | 1/2011 | Rowan et al. | |
| 2012/0131230 A1* | 5/2012 | Ady | G06F 21/44 |
| | | | 710/8 |
| 2012/0205990 A1* | 8/2012 | Minnoy | H02J 13/00004 |
| | | | 307/116 |
| 2012/0310428 A1* | 12/2012 | Katagi | H04L 63/0876 |
| | | | 700/292 |
| 2013/0262906 A1 | 10/2013 | Munjal et al. | |
| 2013/0289789 A1 | 10/2013 | Ewing et al. | |
| 2014/0325218 A1* | 10/2014 | Shimizu | H04W 12/069 |
| | | | 713/168 |
| 2015/0006395 A1* | 1/2015 | Chu | G06Q 20/40 |
| | | | 705/44 |
| 2015/0154136 A1* | 6/2015 | Markovic | G06F 21/44 |
| | | | 710/317 |
| 2015/0271673 A1* | 9/2015 | Lord | H02J 50/20 |
| | | | 455/411 |
| 2017/0147807 A1* | 5/2017 | Rooyakkers | G05B 19/0425 |
| 2017/0169640 A1* | 6/2017 | Britt | G06F 21/35 |
| 2018/0205414 A1* | 7/2018 | Tateishi | H04B 3/36 |
| 2018/0359109 A1 | 12/2018 | O'Hora | |
| 2019/0332774 A1* | 10/2019 | Nix | H04W 12/50 |
| 2020/0014544 A1* | 1/2020 | Sela | G06F 21/79 |
| 2020/0266675 A1* | 8/2020 | Lee | H02J 7/00034 |
| 2021/0263083 A1* | 8/2021 | Hwang | G06Q 50/06 |
| 2021/0384747 A1* | 12/2021 | Kim | G06F 21/44 |
| 2022/0263819 A1* | 8/2022 | Kim | H02J 7/00045 |

OTHER PUBLICATIONS

CISCO: "Overview of EAP-FAST," EAP-FAST for Windows Vista Administrator Guide, Chapter 1, Jun. 2008, 4 pages.

CISCO: "What is a Smart Building?" retrieved from https://www.cisco.com/c/en/us/solutions/smart-building/what-is-a-smart-building.html, Aug. 9, 2023, 3 pages.

COOKIEPRO: "What is a Persistent Cookie?" CookiePro Knowledgebase, https://www.cookiepro.com/knowledge/what-is-a-persistent-cookie/, Aug. 5, 2022, 4 pages.

DES: "National Electrical Code (NEC) Releases New Class 4 Fault-Managed Power Category," https://www.descomm.com/articles/National-Electrical-Code-(NEC)-Releases-Nlew-Class-4-Fault-Managed-Power-Category, Aug. 4, 2022, 3 pages.

Friel O., et al., "Bootstrapped TLS Authentication with Proof of Knowledge (TLS-POK)," https://datatracker.ietf.org/doc/html/draft-ietf-emu-bootstrapped-tls, Network Working Group, Standards Track, Jun. 22, 2023, 11 Pages.

Gobok C., "Jumpstarting IEEE 802.3bt's PoE++," https://www.arrow.com/en/research-and-events/articles/jumpstarting-IEEE, May 28, 2020, 4 pages.

NILE: "What Is MACsec?" retrieved from https://nilesecure.com/enterprise-network/security/what-is-macsec/, on Aug. 9, 2023, 12 pages.

PICA8: "PoE Over LLDP Power Negotiation," https://docs.pica8.com/display/PICOS2111cg/PoE+over+LLDP+Power+Negotiation, Nov. 12, 2018, 4 pages.

Pritikin M., et al., "Bootstrapping Remote Secure Key Infrastructure (BRSKI)," Internet Engineering Task Force (IETF), RFC 8995, ISSN: 2070-1721, https://dl.acm.org/doi/book/10.17487/RFC8995, May 2021, 116 pages.

USB: "Universal Serial Bus Security Foundation Specification," Revision 1.0 with ECN and Errata, https://www.usb.org/document-library/usb-authentication-specification-rev-10-ecn-and-errata-through-january-7-2019, Jan. 7, 2019, 27 pages.

USB: "Universal Serial Bus Type-C™ Authentication Specification," Revision 1.0 with ECN and Errata, https://www.usb.org/document-library/usb-authentication-specification-rev-10-ecn-and-errata-through-january-7-2019, Jan. 7, 2019, 53 pages.

Watsen K., et al., "A Voucher Artifact for Bootstrapping Protocols," Internet Engineering Task Force (IETF), RFC 8366, ISSN: 2070-1721, https://datatracker.ietf.org/doc/html/rfc8366, May 9, 2018, 23 pages.

Wi-Fi Alliance: "Wi-Fi Easy Connect," retrieved from https://www.wi-fi.org/discover-wi-fi/wi-fi-easy-connect, Aug. 9, 2023, 6 pages.

Wikipedia: "Diffie-Hellman Key Exchange," retrieved from https://en.wikipedia.org/wiki/Diffie%E2%80%93Hellman_key_exchange, Aug. 9, 2023, 12 pages.

Wikipedia: "Power Management Integrated Circuit," retrieved from https://en.wikipedia.org/wiki/Power_management_integrated_circuit, Aug. 9, 2023, 2 pages.

* cited by examiner

FAST REPOWERING USING CRYPTOGRAPHICALLY PROTECTED IDENTITY

CROSS REFERENCE TO RELATED APPLICATION

This application claims priority to U.S. Provisional Application No. 63/502,957, filed May 18, 2023, the entirety of which is incorporated herein by reference.

TECHNICAL FIELD

The present disclosure relates to power systems. More particularly, the present disclosure relates to uniquely identifying a requestor of power when a consuming device is connected to the network, while also providing a fast restart for subsequent instances when the device connects to the network switch.

BACKGROUND

Over its 100-plus years of existence, the National Electric Code (NEC) has only defined three classes of electrical power, with each representing a distinct characteristic of a circuit's voltage threshold. The most recent update is referred to as Class 4 Power, or more simply "Class 4". Class 4 systems leverage Fault-Managed power (FMP) technology. These systems are not power limited and can deliver hundreds or thousands of watts of power. However, these systems intelligently limit the amount of energy that can go into a fault. Limiting the fault energy mitigates the risk of shock or fire and allows the installation of Class 4 circuits using methods like power-limited circuits.

Like Power over Ethernet (POE), Class 4 is touch-safe and ground-safe, therefore would come with similar CAPEX savings from reduced labor. Unlike PoE, Class 4 is not limited to 100 w per circuit or 100 m reach. Consequently, smart buildings may run their entire local electrical grid with Class 4, rather than using PoE only for "last-mile" (or rather, last-0.06-mile) and small loads.

In parallel, in the home and office we are seeing mobile devices, such as phones, tablets, laptops are ever more reliant on wireless technology to communicate (Wi-Fi™, cellular, satellite, etc.). However, even as they continue to reduce power consumption and improve battery performance, power outlets for them are still required. At the same time stationary devices, such as sensors, lighting fixtures, small appliances, and computer peripherals (monitors, smart desks, etc.) will continue to be powered by wires, but could start to benefit from limited data capacity along the same wires. This may lead to a bifurcation in the copper switching ports delineated by connection speed.

The high-speed segment will primarily be used to connect and power wireless access points or cellular base stations. This is less than 20% of copper ports in an office environment today. The low-speed segment likely will first coalesce around approximately 1 Gbps 90 W and RJ45 as a standard, simply due to the availability and cost of the components. With all the change underway with power cabling and exposed ports, there is an opportunity to disrupt the concepts involved with the consumption of power.

BRIEF DESCRIPTION OF THE DRAWINGS

The description of the present disclosure will be more fully understood with reference to the following figures, which are presented as exemplary embodiments of the disclosure and should not be construed as a complete recitation of the scope of the disclosure, wherein.

Figure 1:
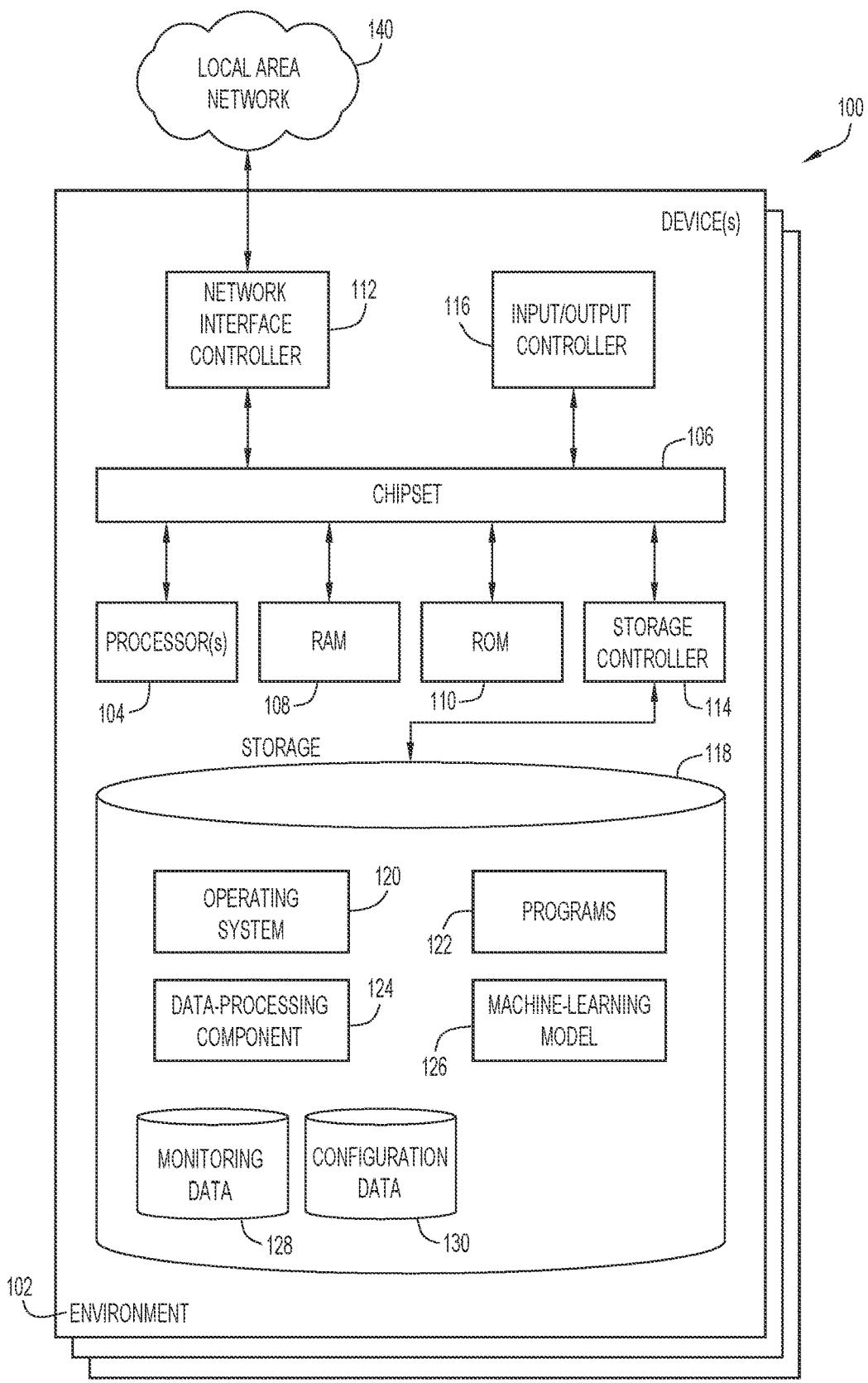
FIG. 1 is a conceptual block diagram for one or more devices capable of executing components and logic for implementing the functionality and embodiments described herein in accordance with various embodiments of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

Overview

In response to the problems described above, devices and methods are discussed herein that uniquely identify the requestor of power when a consuming device is connected to the network, while also providing a fast restart for subsequent instances wherein the device connects to the network switch. As power rates jump with 90 W PoE, 380V DC, and FMP, it is important to have endpoint identification and admission control before sending power. This may be accomplished via hardware protected credentials that can be associated with a specific identity which is allowed to draw power at designated rates.

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom VLSI circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors, logics, or controllers. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, controller, logic, or device.

Computer program code for carrying out operations for aspects of the present disclosure may be written in any combination of one or more programming languages, including an object-oriented programming language such as Python, Java, Smalltalk, C++, C#, Objective C. or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component or element may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor, controller, and/or logic of a computer or other programmable data processing apparatus to produce a machine, such that the instructions, which execute via the processor, controller, logic, or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Reference throughout this specification to "one embodiment," "an embodiment," "an example," or similar language means that a particular feature, structure, or characteristic described in connection with the embodiment is included in at least one embodiment of the present disclosure. Thus, appearances of the phrases "in one embodiment," "in an embodiment," "in one example," and similar language throughout this specification may, but do not necessarily, all refer to the same embodiment, but mean "one or more but not all embodiments" unless expressly specified otherwise. Additionally, particular features, structures, or characteristics described with respect to one embodiment may be included in other embodiments to provide one or more useful combinations of the embodiments described herein.

The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Referring to FIG. 1, a conceptual block diagram for one or more devices 100 capable of executing components and logic for implementing the functionality and embodiments described herein in accordance with various embodiments of the disclosure is shown. The embodiment of the conceptual block diagram depicted in FIG. 1 can illustrate a conventional server computer, workstation, desktop computer, laptop, tablet, network appliance, e-reader, smartphone, or other computing device, and can be utilized to execute any of the application and/or logic components presented herein. The device 100 may, in some examples, correspond to physical devices or to virtual resources described herein.

In many embodiments, the device 100 may include an environment 102 such as a baseboard or "motherboard," in physical embodiments that can be configured as a printed circuit board with a multitude of components or devices connected by way of a system bus or other electrical communication paths. Conceptually, in virtualized embodiments, the environment 102 may be a virtual environment that encompasses and executes the remaining components and resources of the device 100. In more embodiments, one or more processors 104, such as, but not limited to, central processing units ("CPUs") can be configured to operate in conjunction with a chipset 106. The processor(s) 104 can be standard programmable CPUs that perform arithmetic and logical operations for the operation of the device 100.

In additional embodiments, the processor(s) 104 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 106 may provide an interface between the processor(s) 104 and the remainder of the components and devices within the environment 102. The chipset 106 can provide an interface to a random-access memory ("RAM") 108, which can be used as the main memory in the device 100 in some embodiments. The chipset 106 can further be configured to provide an interface to a computer-readable storage medium such as a read-only memory ("ROM") 110 or non-volatile RAM ("NVRAM") for storing basic routines that can help with various tasks such as, but not limited to, starting up the device 100 and/or transferring information between the various components and devices. The ROM 110 or NVRAM can also store other application components for the operation of the device 100 in accordance with various embodiments described herein.

Different embodiments of the device 100 can be configured to operate in a networked environment using logical connections to remote computing devices and computer systems through a network, such as the network 140. The chipset 106 can include functionality for providing network connectivity through a network interface card ("NIC") 112, which may comprise an Ethernet adapter or similar component. The NIC 112 can be capable of connecting the device 100 to other devices over the network 140. It is contemplated that multiple NICs 112 may be present in the device 100, connecting the device to other types of networks and remote systems.

In further embodiments, the device 100 can be connected to a storage 118 that provides non-volatile storage for data accessible by the device 100. The storage 118 can, for example, store an operating system 120, applications 122, and data, which are described in greater detail below. The storage 118 can be connected to the environment 102 through a storage controller 114 connected to the chipset 106. In certain embodiments, the storage 118 can consist of one or more physical storage units. The storage controller 114 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 100 can store data within the storage 118 by transforming the physical state of the physical storage units to reflect the information being stored. The specific transformation of physical state can depend on various factors. Examples of such factors can include, but are not limited to, the technology used to implement the physical storage units, whether the storage 118 is characterized as primary or secondary storage, and the like.

For example, the device 100 can store information within the storage 118 by issuing instructions through the storage controller 114 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 100 can further read or access information from the storage 118 by detecting the physical states or characteristics of one or more particular locations within the physical storage units.

In addition to the storage 118 described above, the device 100 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 100. In some examples, the operations performed by a cloud computing network, and or any components included therein, may be supported by one or more devices similar to device 100. Stated otherwise, some or all of the operations performed by the cloud computing network, and or any components included therein, may be performed by one or more computer devices 100 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 118 can store an operating system 120 utilized to control the operation of the device 100. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 118 can store other system or application programs and data utilized by the device 100.

In various embodiment, the storage 118 or other computer-readable storage media is encoded with computer-executable instructions which, when loaded into the device 100, may transform it from a general-purpose computing system into a special-purpose computer capable of implementing the embodiments described herein. These computer-executable instructions may be stored as application 122 and transform the device 100 by specifying how the processor(s) 104 can transition between states, as described above. In some embodiments, the device 100 has access to computer-readable storage media storing computer-executable instructions which, when executed by the device 100, perform the various processes described below. In more embodiments, the device 100 can also include computer-readable storage media having instructions stored thereupon for performing any of the other computer-implemented operations described herein.

In still further embodiments, the device 100 can also include one or more input/output controllers 116 for receiving and processing input from a number of input devices, such as a keyboard, a mouse, a touchpad, a touch screen, an electronic stylus, or other type of input device. Similarly, an input/output controller 116 can be configured to provide output to a display, such as a computer monitor, a flat panel display, a digital projector, a printer, or other type of output device. Those skilled in the art will recognize that the device 100 might not include all of the components shown in FIG. 1 and can include other components that are not explicitly shown in FIG. 1; or might utilize an architecture completely different than that shown in FIG. 1.

As described above, the device 100 may support a virtualization layer, such as one or more virtual resources executing on the device 100. In some examples, the virtualization layer may be supported by a hypervisor that provides one or more virtual machines running on the device 100 to perform functions described herein. The virtualization layer may generally support a virtual resource that performs at least a portion of the techniques described herein.

In many embodiments, the device 100 can include a device logic 124. The device logic 124 can include components of logic described above configured to carry out one or more aspects described herein. In certain embodiments, the device logic 124 can operate a device to deploy, execute, or otherwise operate various operating systems 120, applications 122, or machine-learning models 126. The device logic 124 can be configured to facilitate communications between these various components and external devices via the NIC 112 or other such communication ports.

In more embodiments, data may be processed into a format usable by a machine-learning model 126 (e.g., feature vectors), and or other pre-processing techniques. The machine-learning ("ML") model 126 may be any type of ML model, such as supervised models, reinforcement models, and/or unsupervised models. The ML model 126 may include one or more of linear regression models, logistic regression models, decision trees, Naïve Bayes models, neural networks, k-means cluster models, random forest models, and/or other types of ML models 126.

In a number of embodiments, the storage 118 can include monitoring data 128. In some embodiments, monitoring data 128 can refer to the settings and parameters that are used to configure the model and control its behavior during training, operation, and/or inference. These settings can have a significant impact on the performance of the model and are often tuned through a process of trial and error to optimize the model's accuracy or other performance metrics.

In certain embodiments, monitoring data 128 may include hyperparameters, which may control the overall structure of the model and how it is trained. Examples of hyperparameters include the learning rate, the number of layers in a neural network, and the size of each layer, etc. Another type of monitoring data 128 may be feature selection, which can involve training the model on a subset of the available input features or weighting certain features more heavily than others. In addition to hyperparameters and feature selection, monitoring data 128 can also include other settings such as the loss function used to measure the difference between the model's predicted output and the configuration data 130 during training, regularization techniques used to prevent overfitting, and algorithms used to update the model's parameters during training.

In various embodiments, the storage 118 can include configuration data 130. Configuration data 130 can be the set of data that is used to evaluate the performance of a machine learning model. It represents the true, correct or expected output for a given input, against which the model's output can be compared to determine its accuracy. In supervised learning, where the machine learning model is trained on labeled data, the configuration data 130 is typically the set of labels or correct answers associated with the training data. The model is trained to minimize the difference between its predicted output and the configuration data 130, so that it can accurately make predictions on new, unseen data. For example, in an image classification task, the configuration data 130 might consist of a set of labeled images, where each image is labeled with the correct object or category it contains. After training the model on this labeled data, the configuration data 130 can be used to evaluate the accuracy of the model's predictions on new, unseen images.

In unsupervised learning, where the machine learning model learns from unlabeled data, configuration data 130 may be more difficult to define. In this case, evaluation may be based on other measures such as clustering or similarity scores, which can be compared to known configuration data 130 for similar tasks. In various embodiments, configuration data 130 can be important for measuring the performance of a machine learning model and ensuring that it is accurate and reliable. However, the quality of the configuration data 130 itself is also critical, as incorrect, or biased configuration data 130 can lead to inaccurate evaluation of the model's performance.

Although a specific embodiment for a device suitable for carrying out the various steps, processes, methods, and operations described herein is discussed with respect to FIG. 1, any of a variety of systems and/or processes may be utilized in accordance with embodiments of the disclosure. For example, the device may be virtualized or disposed as a logic and data stores within a mobile or personal general computing device, allowing for the transformation of the device, upon execution by a processor/controller to the device 100 described within FIG. 1. The elements depicted in FIG. 1 may also be interchangeable with other elements of FIGS. 2-6 as to realize a particularly desired embodiment.

Network devices may provide connected computing devices with electrical power at various power levels through the same cabling as data communications. For instance, PoE may be used for transmitting data and power simultaneously using a single network cable. In general, PoE technology sends 10/100/1000 Mbps of data and 15 W. 30 W, 60 W, and up to 90 W of power budget to devices over Cat5e, Cat6, Cat6a. Cat7 and Cat8 Ethernet cables for a maximum distance of 100 m. As shown, FMP may be useful for higher power scenarios, including ranges of 400 W-2000 W plus of power, without limitation.

With all the change underway with power cabling and exposed ports, there is an opportunity to disrupt the concepts involved with the consumption of power. Elements of access port authentication and security may be utilized to selectively deliver power to devices which can prove aspects of their individual identity in a way which sharply curtails their exposure to Man-in-the-Middle (MITM) identity attacks for power or data stealing. In other words, we can push power to devices with power management integrated circuits which can prove that they are legitimately authorized to pull from the upstream power switch on a specific copper port.

Along this line, it is important to make it very easy to onboard devices so that their unique identity may be easily associated and portable across multiple power accounting contexts. And it is useful that power can be delivered extremely fast to match requested demand. It should be appreciated that perceptibly slow boot time while waiting for cryptographic operations to synchronize is undesirable.

Furthermore, it is recommended for the concept of power to move away from being a shared bus in some embodiments. Instead, power may be conceived as content is projected only at specific, verified users. It is contemplated that these users can have full mobility of their devices. In other words, credentials as described herein could work within a corporation or anywhere, akin to roaming capabilities and accounting across today's mobile data networks.

Device authentication via a Layer 2 identity like a Media Access Control (MAC) address may not be sufficient. To perform identity determination properly, there should be a secure interaction established between a network-based source of power and the endpoint device that consumes that power. These secure interactions uniquely identify some consuming identity which is an authorized receiver of that power (represented by a power management integrated circuit) while eliminating the chance of MITM attacks. Additionally, it is recommended that a secret can be stored in the endpoint device which can be used to jump start any repowering process so that secure tunnels are not needed for initial powering.

Several directions may be possible. For example, current 48 port mGig switch typically consumes ~150-200 W, by throttling the port speed to 10/100 Mbps, one should see the power consumption come down to ~15-20 W. This may have a ripple effect in the rest of the IT infrastructure provisioning, as will significantly reduce peripheral spendings such as cooling cost.

Similarly, today's single pair ethernet formfactor readily reflects 1 km reach and 10 Mbps speed, which is still leaps and bounds beyond what most IoT applications use, even including IT ones such as VOIP. If this can be combined with Class 4 Circuits to deliver a few hundred watts, and a few Kbps along the same pair of conductors, it has the potential to be the standard for all copper wirings in a building. From the standpoint of power, today's category cables are insulated for 300 Volts and pack enough copper to be 17 AWG equivalent and handle 2.9 Amps of current. While an unlikely scenario, this means if the National Electric Code expands Class 4 to allow category cables, 500 watts may be safely carried and possibly gigabits of data with them.

Figure 2:
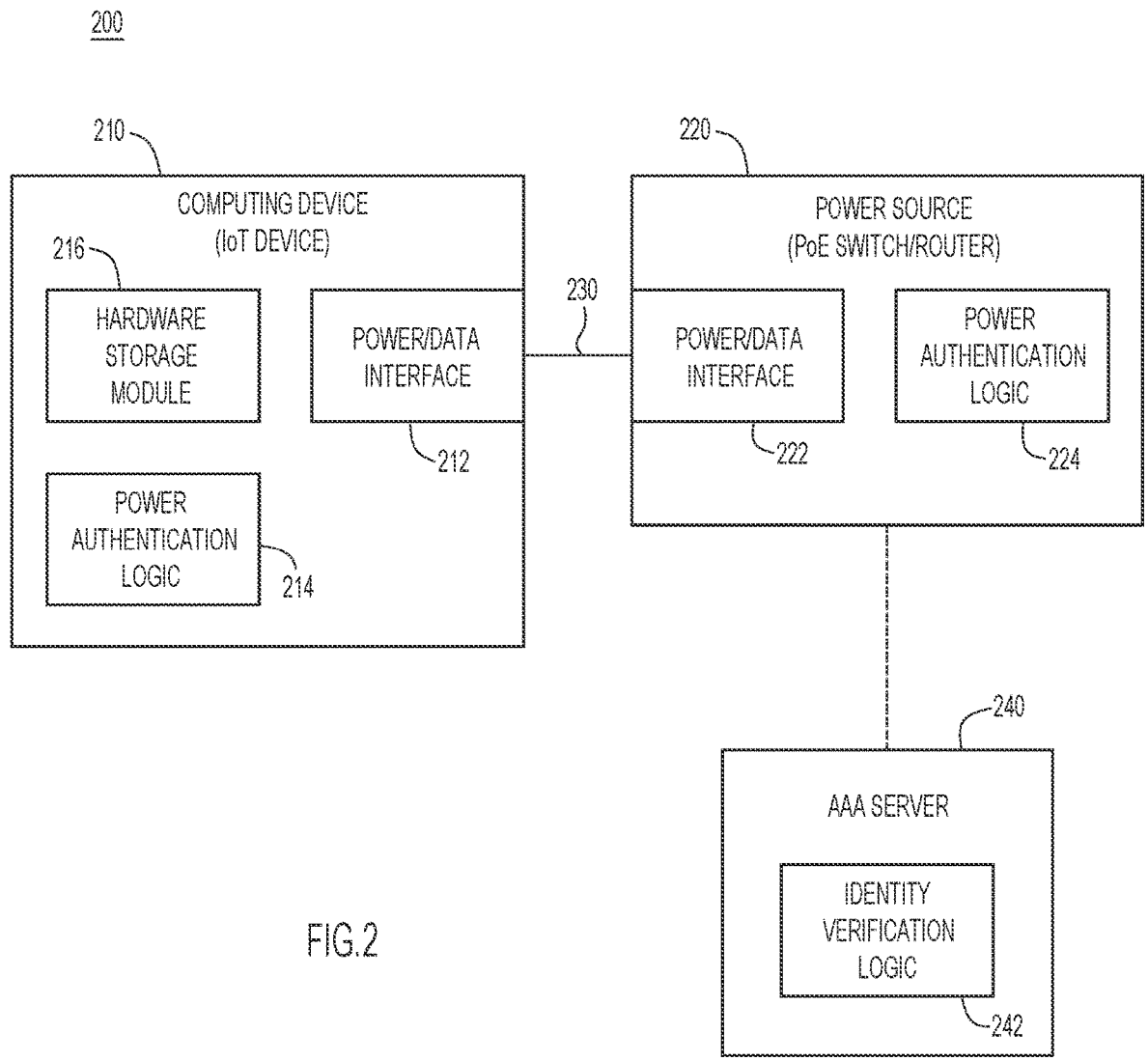
FIG. 2 is a schematic block diagram of a system 200 for authenticated power delivery in accordance with various embodiment of the disclosure.

Referring now to FIG. 2, a system 200 shows one example of providing authenticated power delivery in accordance with various embodiments. The system 200 includes a computing device 210 that includes a combined power/data interface 212, power authentication logic 214, and a hardware storage module 216. The combined power/data interface 212 is configured to connect to a cable that carries both power and data, such as an Ethernet cable connected to a PoE switch/router. The power authentication logic 214 enables the computing device 210 to authenticate a device identity and receive power over the combined power/data interface 212. The hardware storage module is configured to hold credentials, such as a private key, for the device identity.

The system 200 also includes a power source 220 (e.g., a POE switch/router, or an FMP supply device) has a combined power/data interface 222 and power authentication logic 224. The combined power/data interface 222 of the power source 220 provides a similar functionality to the combined power/data interface 212 of the computing device 210, and may take a similar form. The power authentication logic 224 enables the power source 220 to verify a device identity and provide power over the combined power/data interface 222 to a computing device (e.g., computing device 210) with a verified identity.

A cable 230 connects the combined power/data interface 212 of the computing device 210 to the combined power/data interface 222 of the power source 220. In one example, the cable 230 may be an Ethernet cable that is configured for use with a PoE system. In another example, the cable 230 may be a Class 4 FMP cable that is configured for use with an FMP system.

The power source 220 may optionally be connected to an Authentication, Authorization, and Accounting (AAA) server 240. The AAA server 240 includes identity verification logic 242 that enables the AAA server 240 to verify one or more identities and determine whether each identity is authorized to receive power from the power source 220. In one example, the AAA server 240 may be connected to the power source 220 through one or more networks. In another example, the power source 220 may include some or all of the functionality of the AAA server 240.

In a further example, the AAA server 240 may track the power consumption of a computing device (e.g., computing device 210) with a verified identity. Tracking the power profile of an identity may include power consumed by the computing device 210 at multiple power ports and/or across multiple power sources. As an example, the AAA server 240 may compare the amount of power requested by the computing device 210 with the actual amount of power provided by the power source 220. Additionally, the computing device 210 may report the actual consumption of power to the AAA server 240, which may compare the actual consumption by the computing device 210 to the amount of power provided by the power source 220.

By tracking the power profile associated with a verified identity, the AAA server 240 may detect power leaks (e.g., intentional or unintentional extra power usage) and improve the efficiency and security for providing power. For instance, the computing device 210 may report a requested power level of 100 W and an actual power consumption of 80 W while the power source 220 reports providing the requested 100 W of power. In this instance, some power (i.e., 20 W) is lost, and the AAA server 240 may alert an administrator of the system 200 to determine the cause of the power leakage.

In one example, the computing device 210 and the power source 220 may securely exchange indications of how much power was consumed by the computing device 210 over a predetermined time period (e.g., 24 hours) and how much power was provided by the power source 220 over the same predetermined time period. For instance, the computing device 210 may determine how much power the computing device 210 consumed over the predetermined time period and send a message indicating the actual power consumption to the power source, which can then compare the actual consumed power to the actual provided power. The computing device 210 may also digitally sign and/or encrypt the indication of the actual power consumption to further protect against an attacker that may be tapping into the cable 230. Based on the comparison between the actual power consumption by the computing device 210 and the amount of power actually provided by the power source 220, the power source 220 may determine an amount of power leakage in the cable 230. If the amount of power leakage exceeds a predetermined limit, the power source 220 may take one or more actions to mitigate the power leakage, such as removing some or all power to the computing device 210 and/or notifying an administrator.

Alternatively, or in addition, the power source 220 may provide an indication of the actual amount of power provided to the computing device 210 over the predetermined time period. The computing device 210 may compare the amount of power provided by the power source 220 to the amount of power actually consumed by the computing device to determine the amount of power leakage in the cable 230. The power source 220 may digitally sign and/or encrypt the indication of the actual power provided to the computing device 210 to prevent an attacker from intercepting and/or altering the indication of actual power provided to the computing device 210.

In another example, tracking the power consumption of a device with a verified identity may enable the operators of the system 200 to provide power as economic compensation for a user associated with the verified identity. For instance, an employee may have a verified identity associated with their laptop computer, and their employer may provide a specific amount of power that is sufficient for their laptop computer as part of a work contract.

In another instance, a device (e.g., an electric vehicle) with a verified identity may purchase a predetermined amount of energy (e.g., 200 kWh) for a month, and the AAA server 240 may track the amount of power provided to the device over that month. The AAA server 240 may also track any power provided back to the power source 220 and credit the identity with the additional energy. With mutually authenticated computing devices and power sources, the system 200 may provide the basis for an energy economy between providers and consumers of power.

Figure 3:
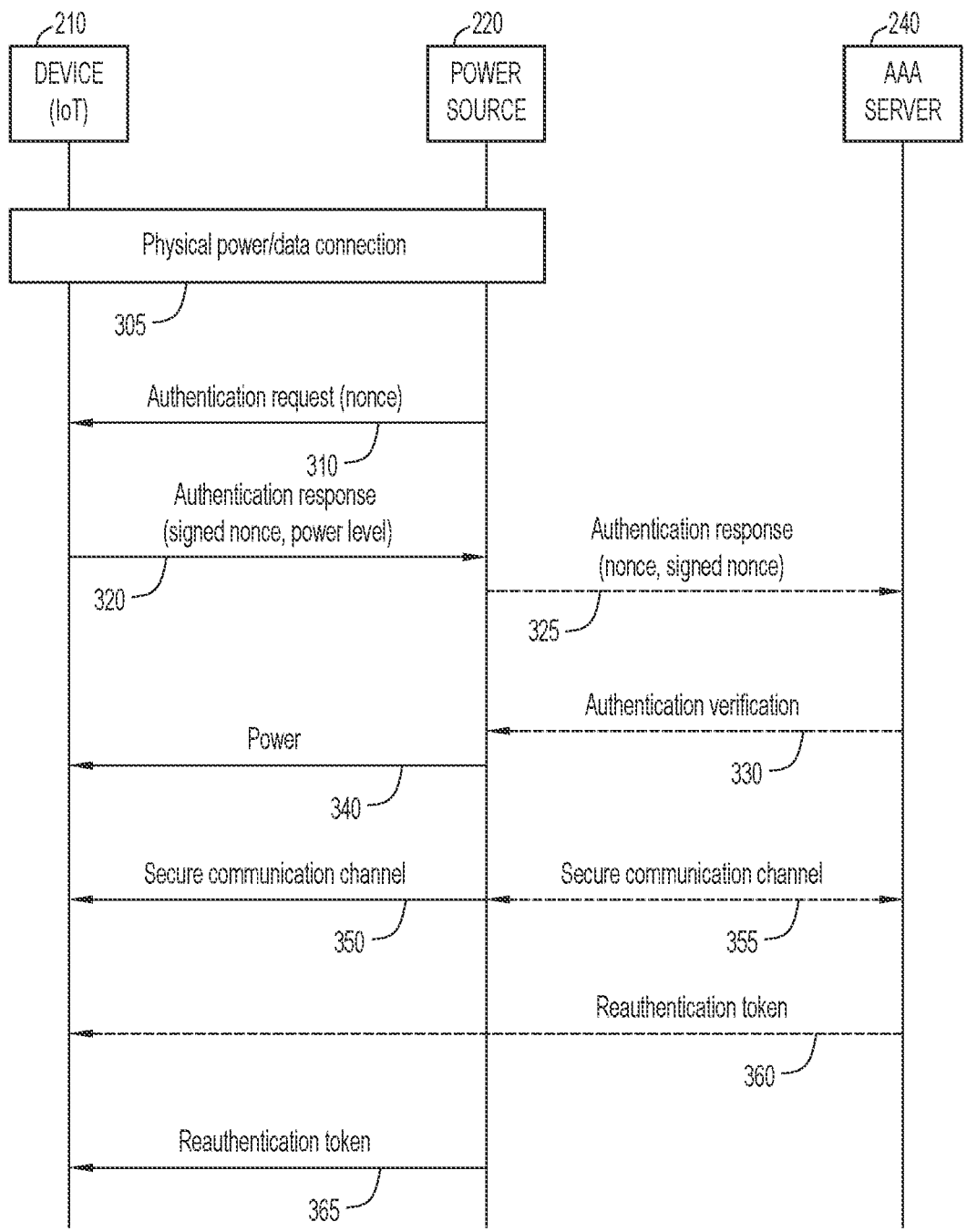
FIG. 3 is a message flow diagram illustrating an initial setup of authenticated power delivery in accordance with various embodiment of the disclosure.

Referring now to FIG. 3, a message flow 300 illustrates an example of an initial exchange between a computing device 210 (e.g., an Internet of Things (IoT) device) and a power source 220 (e.g., a POE switch/router) to establish a verified power supply for the computing device 210. The AAA server 240 is depicted as a separate entity from the power source 220, but the functionality of the AAA server 240 may be integrated into the power source 220. Initially, a physical power/data connection 305 is established between the computing device 210 and the power source 220. In one example, the physical connection 305 may be established by plugging a cable (e.g., cable 230 as shown in FIG. 2) into both the computing device 210 and the power source 220.

After detecting the connection 305, the power source 220 provides an authentication request 310 to the computing device 210 over the connection 305. In one example, the authentication request 310 includes a freshness mechanism to guard against replay attacks on the authentication system. For instance, the freshness mechanism may be a randomly generated nonce from the power source 220, an epoch identifier, or a random number provided by a central time service. Hereinafter, the freshness mechanism may be referred to as a nonce, but other mechanisms of freshness mechanisms may be employed to achieve similar results.

The computing device 210 signs the nonce provided in the authentication request 310 and provides an authentication response 320 including the singed nonce to the power source 220. The computing device 210 signs the nonce with credentials (e.g., a private key) associated with an identity that can be verified as authorized for power. In one example, the identity may be a device identity specific to the computing device 210 or a user identity associated with a user of the computing device 210. Additionally, the computing device 210 may include a requested power level in the authentication response 320. In another example, the computing device may sign a group of objects that includes the nonce and other information (e.g., a hardware address) and include the signed group of objects in the authentication response 320.

The power source 220 receives the authentication response 320 and verifies the identity that signed the nonce provided in the authentication request 310. In one example, the power source 220 forwards some or all of the authentication response 320 along as a message 325 to the AAA server 240 for verification. The message 325 may also include the nonce provided to the computing device 210 by the power source 220 to enable the AAA server 240 to ensure that it matches the signed nonce provided by the power source 220. For instance, the AAA server 240 may have a public key associated with the identity asserted by the computing device 210 to confirm that the nonce was signed by the private key of the asserted identity. After verifying the identity of the computing device 210, the AAA server 240 provides an authentication verification message 330 to the power source 220. In another example, the identity verification functionality of the AAA server 240 may be performed at the power source 220.

Once the device identity of the computing device 210 is verified, the power source 220 provides power 340 to the computing device 210. In one example, the power source 220 provides the power 340 at the power level requested by the computing device 210. Alternatively, the power source 220 may determine that the verified identity is authorized for a different power level (e.g., a lower power level) and provides the power 340 at the level that is authorized for the identity of the computing device 210.

The computing device 210 may establish a mutually authenticated secure channel 350 with the power source 220 and/or a mutually authenticated secure channel 355 with the AAA server 240. In one example, the secure channel 350 or 355 may be established via a Diffie-Hellman key exchange. The AAA server 240 may use the secure channel 355 to provide the computing device 210 with a reauthentication token 360. Alternatively, the power source 220 may use the secure channel 350 to provide a reauthentication token 365. In one example, the reauthentication token 360 or 365 enables the computing device 210 to quickly reauthenticate and receive power after being disconnected and reconnected from the power source 220. The computing device 210 may store the reauthentication token 360 in a nonvolatile memory to ensure that the reauthentication token 360 is retained when the computing device loses power.

In another example, the reauthentication token 360 may enable the computing device 210 to authenticate with a second power source (not shown) and receive power from the second power source after being disconnected from the power source 220. Additionally, the reauthentication token may be specific to the verified identity of the computing device 210, such that only a device with the private key associated with verified identity can use the reauthentication token to regain power from the power source 220. For instance, the reauthentication token may be encrypted with the public key of the verified identity, enabling a device with the private key to decrypt the reauthentication token.

In a further example, the secure communication channel 350 (or the secure communication channel 355) may be dynamically maintained while the computing device 210 is connected to the power source 220 (or the AAA server 240). Alternatively, the computing device 210 and the power source 220 may use a secure state (e.g., a Representational State Transfer (REST) Application Programming Interface (API)) to support an intermittent connection through one-time transactions. The secure, intermittent connection enables the computing device 210 to connect to different power sources and use the same reauthentication token to quickly authenticate to the AAA server 240 and receive power.

Figure 4:
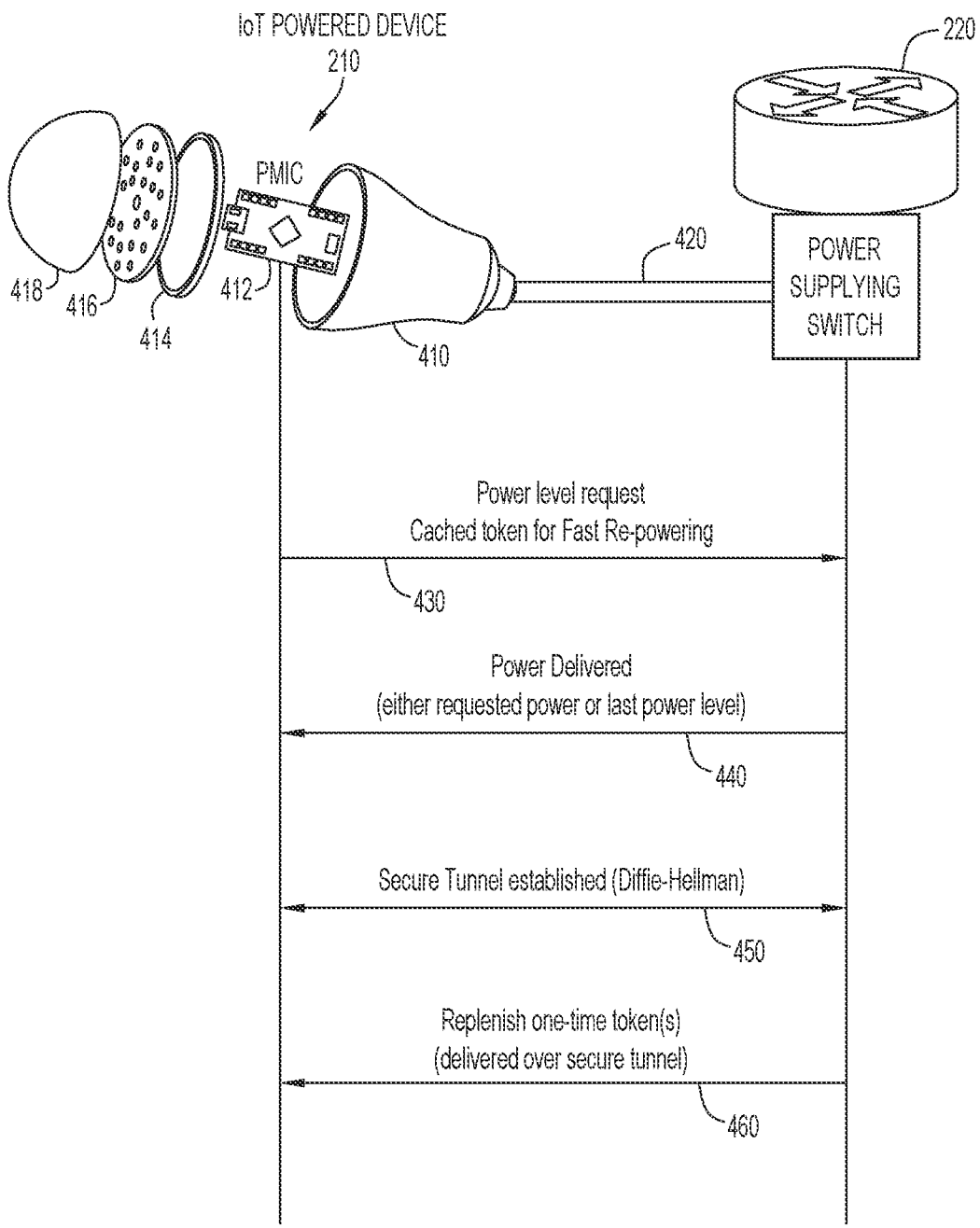
FIG. 4 is a message flow diagram illustrating providing authenticated repowering of a computing device in accordance with various embodiments of the disclosure.

Referring now to FIG. 4, a message flow 400 illustrates an example of a portable computing device (e.g., device 210) quickly repowering from a power supplying switch (e.g., power source 220) using a cached token. The computing device 210 in this example is an IoT lightbulb with a housing 410, a Power Management Integrated Circuit (PMIC) 412, a sensor 414, light emitting elements 416, and a cover 418. The computing device 210 is connected to the power source 220 by a cable 420, such as an Ethernet cable configured to carry power and data. In one example, the PMIC 412 may include a hardware storage module that is configured to store secure credentials, such as a private key associated with an identity and/or a reauthentication token from a previous connection to a power source.

When the computing device 210 reconnects to the power source 220 through the cable 420, the computing device sends a message 430 with a reauthentication token to the power source 220 to reauthenticate the identity of the computing device 210. In one example, the message 430 may include a power level request. For instance, the computing device 210 may request a different power level than it received when the computing device 210 was previously connected.

In another example, the computing device 210 may verify the identity of the power source 220 before providing the message 430 with the reauthentication token to the power source 220. For instance, the power source 220 may provide a verifiably fresh proof of the identity of the power source 220 by signing a current timestamp with a private key associated with the identity of the power source 220. The computing device 210 verifies the identity of the power source 220 with the public key associated with the identity of the power source 220. Verifying the identity of the power source 220 prevents an unauthorized device from intercepting the reauthentication token by presenting as the power source 220.

The power source 220 verifies the reauthentication token in the message 430 and provides power 440 to the computing device 210. In one example, the power source 220 provides the power 440 at the power level requested in the message 430. Alternatively, the power source 220 may provide the power 440 at a power level previously authorized for the identity associated with the computing device 210.

In another example, the power source 220 may provide the power 440 at a different power level than either the previously authorized power level or the requested power level. For instance, the computing device 210 may request a power level that is above a maximum allowed for the cable 420, and the power source 220 may provide the power 440 at a power level that does not exceed the maximum rating of the cable 420. In another instance, the computing device 210 may request a power level that differs from a power level associated with a policy based on the device identity, and the power source 220 may provide the power 440 at the power level associated with the policy. As a specific example, the power source 220 may store a policy that limits IoT light bulbs to 10 W of power. If the computing device 210 provides a reauthentication token that is associated with a device identity of an IoT light bulb, then a policy in the power source 220 may cause the power source 220 to disregard a requested power level of 100 W and provide the 10 W of power that is allowed for the verified device identity of an IoT light bulb.

The computing device 210 and the power source 220 may set up a secure tunnel 450, e.g., via a Diffie-Hellman exchange, for additional communication after the power 440 has been restored to the computing device 210. The power source 220 provides a new reauthentication token 460 to the computing device 210 through the secure tunnel 450. In one example, the secure tunnel 450 may enable the computing device 210 and the power source 220 to refresh an expiration of the authorization of the computing device 210 to receive power. In another example, the secure tunnel 450 may enable the computing device 210 to alter the power level provided by the power source 220.

Furthermore, it should be appreciated that network-based power source 220 may provide power at some agreed-upon level to a specific consumer. A single (possibly hardware protected) key/credential may be used for both network access and power access on a port. An ability within the switching and network management infrastructure to create and distribute a histogram of power usage against a single consuming identity or a set of identities, such as, for example "lighting hardware" is also contemplated.

The ability for a power source to prioritize power delivery across the various connected computing devices with verified identities. For example, there may be certain identities which get power with a higher priority during periods of restricted power availability. In various embodiments, this may be more concrete than some general power priority. Every individual and application could have a trackable power use fingerprint over time. This could be determined by rolling-up consuming identities by summing up power usage per {user/group/asset-class}. And, when tied to the location/source of the provided power, a trackable greenhouse gas (GHG) footprint could result.

It is possible for the network to control what identities can have power from what ports at what times. The ability to determine if power levels on certain switch ports should be constrained or unconstrained. For example, within a retail store, devices in a back office might have no authentication before the ports in the back office provide full power to connected devices. However, on the store floor, specific power (e.g., at a more than a trivial level) would only be provided after a connected device authenticates a verified identity. This may stop retail consumers from charging their laptops in the store, since they do not have credentials for a verified identity.

There is also the option for physical layer protection to verify the level of power sent is the amount of power consumed. Here, the verification mechanism where the consuming PMIC identity positively acknowledges receipt of power on that authenticated port at a certain level over time as part of its credential exchange and/or within the tunnel that is confidential and authenticated. The power source would be able to terminate power to a computing device or make some other policy decision if the power sent is not similar to that being received.

Organizational onboarding mechanisms may provide user identities to each computing device. In other words, a single scan may be all that is involved to associate a computing device with a responsible user. After the onboarding, subsequent requests would allow the cached credentials on the consumer to track power usage of individual users. Power could be seen/given as a form of compensation/money given to employees. For example, one could determine how much power should be given to an employee for their phone/laptop between when they arrive, and when they leave.

In some embodiments, it may be desirable to be more "extreme" regarding the possibilities. For example, after mutually authenticating the power source and the consumer of power, computing devices may bank their power back into the network in association with their user identities. In other words, power could be seen as a form of money/currency which transits an authenticated edge. If a switch port is configured as "No auth required" or if the switch has not yet been configured to authenticate, or if the switch has been specifically configured to not authenticate due to some exceptional situation such as a fire, a default level of power may always be provided on a port without authentication. In these circumstances, the switch may issue an L2 IEEE announcement of some form, indicating that no authentication is required.

Otherwise, when a computing device boots for the first time on a switch port requiring authentication, it may not yet draw its full power. Optionally, in some embodiments the port can draw no more than 15 watts, for example, which it may use for authentication operations. First time bootstrap information may be provided to an AAA system (e.g., AAA server 240). The bootstrap information may include the following elements: a specific bootstrap mechanism (e.g., RFC 8366 or draft-ietf-emu-bootstrapped-tls), an associated credential negotiated over a Diffie-Hellman exchange, and optionally, the maximum power the device will draw. The bootstrap information may take the form of a System for Cross-domain Identity Management (SCIM) schema extension.

The computing device may make use of the appropriate bootstrap mechanism to establish long term credentials. When the device is identified by the AAA system, the AAA system may configure the power source to deliver as much, but no more than the power level specified when that object was made available. Otherwise, the computing device may request a maximum amount of power during AAA authentication, for instance, as a Tunnel Extensible Authentication Protocol (TEAP) Informational Element (IE) in a new Type-Length-Value (TLV). The AAA system may configure the power source to maintain the requested amount of power. The power source may deliver one or more one-time token(s) to the endpoint over the secure session, and the computing device may store locally in case power is interrupted.

Alternatively, the AAA system may deliver the one-time tokens opaquely across the power source. This would allow the computing device powering mobility across various ports within an enterprise. The power source may retain the power authorization until the administrator indicates otherwise, or until carrier is lost, or perhaps until some maximum kWh has been delivered across that session. If no AAA session is established and MAC Authentication Bypass (MAB) is configured, the AAA server may allow the power source to provide power based on MAB policies configured by the administrator.

It should be appreciated that a computing device connected to a switch port may lose power and require reauthentication to repower after previously being authenticated. In this case, the computing device may push a cached token that was obtained as part of an initial exchange with the power source. If that authentication succeeds, the power source can provide power to that device at a previous level. Otherwise, the power source may apply whatever policy for a failed authentication, which may include not providing power, providing power with some form of alert or call-out to a ticket system, or some other policy choice. It is possible for the power source and the AAA server to be co-resident.

Figure 5:
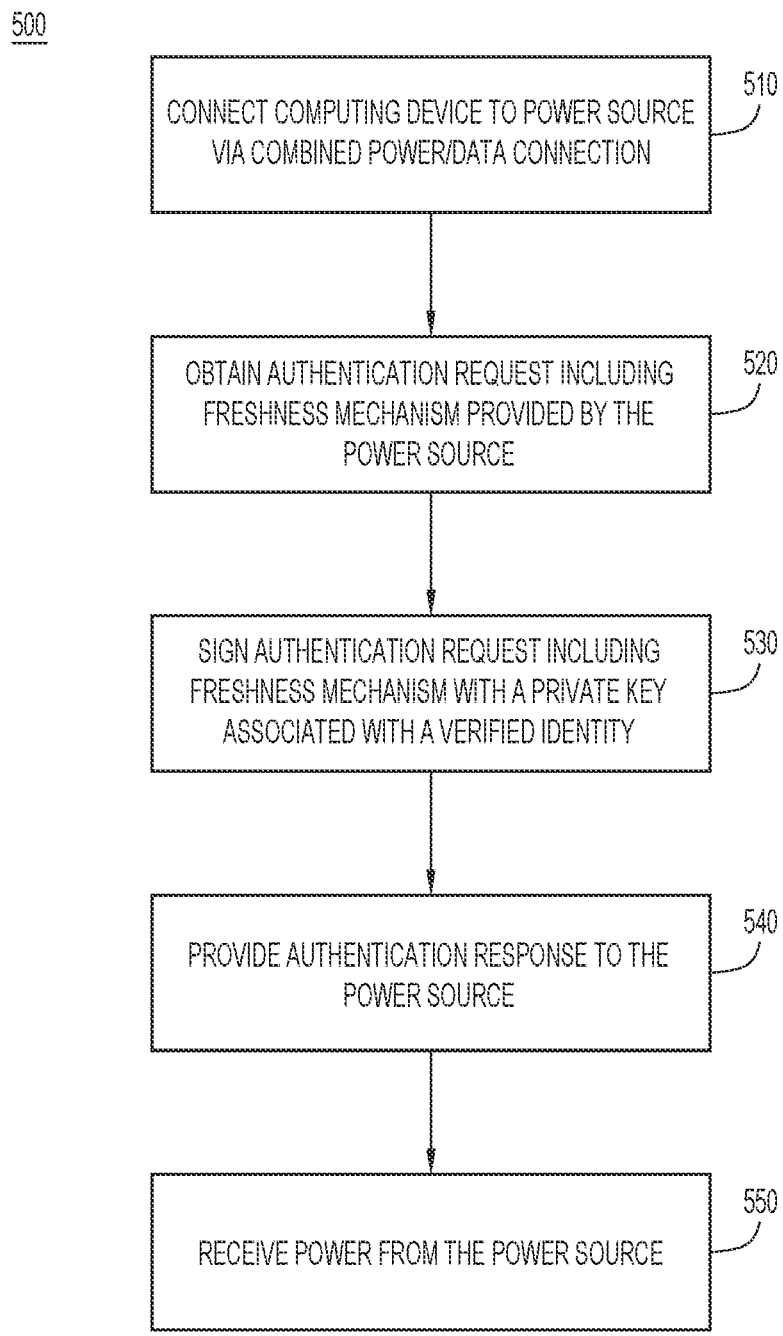
FIG. 5 is a flowchart illustrating operations performed by a computing device to obtain authenticated power delivery in accordance with various embodiments of the disclosure.

Referring now to FIG. 5, a flowchart illustrates an example process 500 performed by a computing device to receive power based on a verified identity. At 510, the computing device connects to a power source via a combined power/data connection. In one example, the combined power/data connection may be an Ethernet cable connected to a PoE-enabled switch/router. At 520, the computing device obtains an authentication request that includes a nonce provided by the power source. In one example, the nonce was provided to the power source from a central network element, such as an AAA server or a time server. In another example, the entire authentication request may originate from an AAA server, and the power source forwards the authentication request from the AAA server to the computing device.

At 530, the computing devices signs the nonce to generate a singed nonce. The computing device signs the nonce with a private key stored on the computing device that is associated with a verified identity. In one example, the private key is programmed into a hardware storage module, for instance, when the computing device was manufactured, and is not obtained over the connection to the power source. In another example, the verified identity may be associated with a user, a user group, a device type, or a device group. At 540, the computing device provides an authentication response including the signed nonce to the power source. The authentication response includes the signed nonce. In one example, the computing device sends the authentication response to an AAA server via the power source. In another example, the computing device may also send a power level request indicating how much power the computing device will consume. The power level request may be included as part of the authentication response or as a separate message.

At 550, the computing device receives power from the power source. In one example, the computing device may also obtain a reauthentication token from the power source that enables the computing device to quickly reauthenticate and receive power after temporarily losing connectivity to the power source. In another example, the reauthentication token enables the computing device to authenticate at a different power source with the verified identity by sending the reauthentication token to an AAA server through the different power source.

Figure 6:
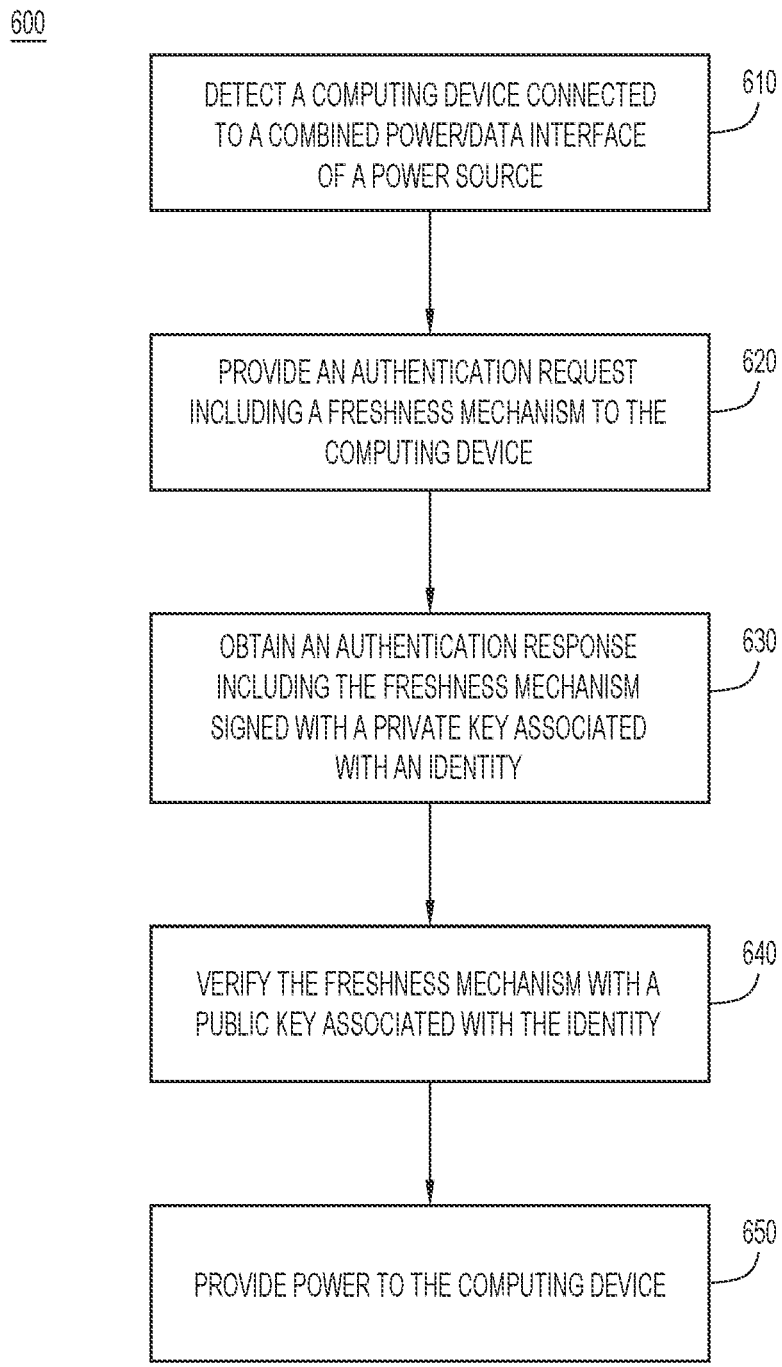
FIG. 6 is a flowchart illustrating operations performed by a power source to provide authenticated power delivery in accordance with various embodiments of the disclosure.

Referring now to FIG. 6, a flowchart illustrates an example process 600 performed by a power source (e.g., power source 220) to provide power to a computing device based on a verified identity. At 610, the power source detects that a computing device (e.g., computing device 210) is connected to a combined power/data interface of the power source. In one example, the power source may perform an initialization procedure (e.g., according to PoE standards) by providing a minimal power level before authenticating the identity of the computing device.

At 620, the power source provides an authentication request to the computing device. The authentication request includes a nonce as a freshness mechanism (e.g., to protect against replay attacks on the authentication of the identity). In one example, the power source receives the authentication request from an AAA server, and forwards the authentication request to the computing device. At 630, the power source obtains an authentication response from the computing device. The authentication response includes the nonce from the authentication request after the computing device signs the nonce with a private key associated with an identity. In one example, the authentication response may include a power level request from the computing device indicating how much power the computing device will consume.

At 640, the power source verifies the nonce with a public key associated with the identity. In one example, the power source may store the public key associated with authorized identities. In another example, the power source may provide some or all of the authentication response to an AAA server to verify the nonce. The AAA server may verify the nonce and the identity of the computing device with the public key of the identity, and provide the power source with confirmation of the identity verification. At 650, the power source provides the computing device with power. In one example, the power source may provide the computing device with power at a power level requested by the computing device or at a previously provided power level.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the' (s)' nomenclature (e.g., one or more element(s)).

In summary, the techniques presented herein provide a system for uniquely identifying a requesting identity when a consuming device is connected to a power source. The power source verifies the identity before providing the power to the device and may track the power consumption of the devices associated with various identities. The system also provides for a reauthentication token that is stored at the computing device after the initial authentication. The reauthentication token allows the computing device to quickly authenticate and receive power from a power source after losing the initial power/data connection.

In some aspects, the techniques described herein relate to a method including: obtaining an authentication request at a computing device that is connected to a power source via a combined power/data connection, the authentication request including a freshness mechanism provided by the power source; signing an authentication response with a private key associated with a verified identity stored on the computing device, the authentication response including the freshness mechanism; providing the authentication response to the power source; and receiving power at the computing device from the power source.

In some aspects, the techniques described herein relate to a method, further including obtaining a reauthentication token from the power source, the reauthentication token authenticating the computing device with the verified identity for a subsequent connection of the computing device to the power source.

In some aspects, the techniques described herein relate to a method, wherein the reauthentication token is encrypted with a public key associated with the private key.

In some aspects, the techniques described herein relate to a method, further including storing the reauthentication token in a nonvolatile memory of the computing device.

In some aspects, the techniques described herein relate to a method, further including: detecting that the combined power/data connection between the computing device and the power source is disconnected; providing the reauthentication token to the power source to enable the computing device to reauthenticate the verified identity to the power source after the combined power/data connection between the computing device and the power source has been reconnected;

and receiving power at the computing device from the power source over the combined power/data connection.

In some aspects, the techniques described herein relate to a method, further including authenticating the power source before providing the reauthentication token to the power source.

In some aspects, the techniques described herein relate to a method, wherein authenticating the power source includes: obtaining a timestamp signed by a private key associated with the power source; and verifying the timestamp with a public key associated with the power source.

In some aspects, the techniques described herein relate to a method, wherein a power level received over the combined power/data connection after it has been reconnected corresponds to a requested power level provided with the reauthentication token.

In some aspects, the techniques described herein relate to a method, further including: establishing a mutually authenticated secure communication channel between the computing device and the power source; and obtaining a reauthentication token from the power source.

In some aspects, the techniques described herein relate to a method, further including providing a requested power level from the computing device to the power source, wherein the power source provides the power to the computing device in response to the authentication response.

In some aspects, the techniques described herein relate to a method, further including: receiving a default power level at the computing device before obtaining the authentication request; and receiving the requested power level at the computing device after providing the authentication response.

In some aspects, the techniques described herein relate to a method, further including: determining a first amount of power consumed by the computing device during a predetermined time period; and providing to the power source an indication of the first amount of power.

In some aspects, the techniques described herein relate to a method, further including: determining a first amount of power consumed by the computing device during a predetermined time period; obtaining from the power source an indication of a second amount of power provided to the computing device by the power source during the predetermined time period; and comparing the first amount of power with the second amount of power to determine a measure of power leakage over the combined power/data connection during the predetermined time period.

In some aspects, the techniques described herein relate to an apparatus including: a combined power/data interface configured to receive power and communicate with a power source; a hardware storage device configured to store a private key associated with a verified identity; and a processor coupled to the combined power/data interface and the hardware storage device, the processor configured to: obtain an authentication request via the combined power/data interface, the authentication request including a nonce provided by the power source; sign the nonce with the private key to generate a signed nonce; cause the combined power/data interface to provide an authentication response including the signed nonce to the power source; and receive power for the apparatus from the power source over the combined power/data interface.

In some aspects, the techniques described herein relate to an apparatus, wherein the processor is further configured to obtain a reauthentication token from the power source via the combined power/data interface, the reauthentication token authenticating the apparatus with the verified identity for a subsequent connection of the apparatus to the power source.

In some aspects, the techniques described herein relate to an apparatus, wherein the processor is further configured to: detect that the combined power/data interface is disconnected from the power source; determine that the combined power/data interface is reconnected to the power source; cause the combined power/data interface to provide the reauthentication token to the power source to enable the apparatus to reauthenticate the verified identity to the power source; and receive power for the apparatus from the power source over the combined power/data interface after it has been reconnected to the power source.

In some aspects, the techniques described herein relate to an apparatus, wherein a power level received over the combined power/data interface after it has been reconnected to the power source corresponds to a requested power level indicated in the authentication response.

In some aspects, the techniques described herein relate to an apparatus, wherein the processor is further configured to: establish a mutually authenticated secure communication channel between the apparatus and the power source; and obtain a reauthentication token from the power source.

In some aspects, the techniques described herein relate to an apparatus, wherein the processor is further configured to cause the combined power/data interface to provide a requested power level to the power source, wherein the power source provides the power for the apparatus in response to the authentication response.

In some aspects, the techniques described herein relate to an apparatus, wherein the combined power/data interface is further configured to: receive a default power level for the apparatus before obtaining the authentication request; and receive the requested power level for the apparatus after providing the authentication response.

In some aspects, the techniques described herein relate to a system including: a power source configured to provide power to devices associated with at least one of a plurality of verified identities; and a computing device configured to: connect to the power source via a combined power/data connection; obtain an authentication request from the power source, the authentication request including a nonce provided by the power source; sign the nonce with a private key stored on the computing device to generate a signed nonce, the private key associated with a verified identity; provide an authentication response including the signed nonce to the power source; and receive power at the computing device from the power source.

In some aspects, the techniques described herein relate to a system, wherein the power source is further configured to provide a reauthentication token to the computing device, the reauthentication token authenticating the computing device with the verified identity for a subsequent connection of the computing device to the power source.

In some aspects, the techniques described herein relate to a system, wherein the computing device is further configured to: detect that the combined power/data connection between the computing device and the power source is disconnected; reconnect the combined power/data connection between the computing device and the power source; provide the reauthentication token to the power source to enable the computing device to reauthenticate the verified identity to the power source; and receive power at the computing device from the power source over the combined power/data connection.

In some aspects, the techniques described herein relate to a system, wherein the power source is configured to provide power to the computing device over the combined power/data connection after it has been reconnected to the power source at a power level received that corresponds to a requested power level indicated in the authentication response.

In some aspects, the techniques described herein relate to a system, wherein the computing device is further configured to: establish a mutually authenticated secure communication channel between the computing device and the power source; and obtain a reauthentication token from the power source.

In some aspects, the techniques described herein relate to a system, further including an authentication server in communication with the power source, the authentication server configured to authorize the verified identity associated with the computing device to receive power from the power source.

Each example embodiment disclosed herein has been included to present one or more different features. However, all disclosed example embodiments are designed to work together as part of a single larger system or method. The disclosure explicitly envisions compound embodiments that combine multiple previously-discussed features in different example embodiments into a single system or method.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
    obtaining an authentication request at a computing device that is connected to a power source via a combined power/data connection, the authentication request including a freshness mechanism provided by the power source;
    signing an authentication response with a private key associated with a verified identity of the computing device stored on the computing device, the authentication response including the freshness mechanism;
    providing the authentication response to the power source;
    receiving power at the computing device from the power source; and
    obtaining a reauthentication token from the power source, the reauthentication token authenticating the computing device with the verified identity for a subsequent connection of the computing device to the power source, wherein the reauthentication token is encrypted with a public key associated with the private key.

2. The method of claim 1, further comprising storing the reauthentication token in a nonvolatile memory of the computing device.

3. The method of claim 1, further comprising:
    detecting that the combined power/data connection between the computing device and the power source is disconnected;
    providing the reauthentication token to the power source to enable the computing device to reauthenticate the verified identity to the power source after the combined power/data connection between the computing device and the power source has been reconnected; and
    receiving power at the computing device from the power source over the combined power/data connection.

4. The method of claim 3, further comprising authenticating the power source before providing the reauthentication token to the power source.

5. The method of claim 4, wherein authenticating the power source comprises:
    obtaining a timestamp signed by a private key associated with the power source; and
    verifying the timestamp with a public key associated with the power source.

6. The method of claim 3, wherein a power level received over the combined power/data connection after the combined power/data connection has been reconnected corresponds to a requested power level provided with the reauthentication token.

7. The method of claim 1, further comprising:
    establishing a mutually authenticated secure communication channel between the computing device and the power source; and
    obtaining a reauthentication token from the power source.

8. The method of claim 1, further comprising providing a requested power level from the computing device to the power source, wherein the power source provides the power to the computing device in response to the authentication response.

9. The method of claim 8, further comprising:
    receiving a default power level at the computing device before obtaining the authentication request; and
    receiving the requested power level at the computing device after providing the authentication response.

10. The method of claim 1, further comprising:
    determining a first amount of power consumed by the computing device during a predetermined time period; and
    providing to the power source an indication of the first amount of power.

11. The method of claim 1, further comprising:
    determining a first amount of power consumed by the computing device during a predetermined time period;
    obtaining from the power source an indication of a second amount of power provided to the computing device by the power source during the predetermined time period; and
    comparing the first amount of power with the second amount of power to determine a measure of power leakage over the combined power/data connection during the predetermined time period.

12. An apparatus comprising:
    a combined power/data interface configured to receive power and communicate with a power source;
    a hardware storage device configured to store a private key associated with a verified identity of the apparatus; and
    a processor coupled to the combined power/data interface and the hardware storage device, the processor configured to:
        obtain an authentication request via the combined power/data interface, the authentication request including a nonce provided by the power source;
        sign the nonce with the private key to generate a signed nonce;
        cause the combined power/data interface to provide an authentication response including the signed nonce to the power source;
        receive power for the apparatus from the power source over the combined power/data interface; and
        obtain a reauthentication token from the power source, the reauthentication token authenticating the apparatus with the verified identity for a subsequent connection of the apparatus to the power source, wherein the reauthentication token is encrypted with a public key associated with the Private key.

13. The apparatus of claim 12, wherein the processor is further configured to:
    detect that the combined power/data interface is disconnected from the power source;
    determine that the combined power/data interface is reconnected to the power source;
    cause the combined power/data interface to provide the reauthentication token to the power source to enable the apparatus to reauthenticate the verified identity to the power source; and receive power for the apparatus from the power source over the combined power/data interface after it has been reconnected to the power source.

14. The apparatus of claim 13, wherein a power level received over the combined power/data interface after the combined power/data interface has been reconnected to the power source corresponds to a requested power level indicated in the authentication response.

15. The apparatus of claim 12, wherein the processor is further configured to:
   establish a mutually authenticated secure communication channel between the apparatus and the power source; and
   obtain a reauthentication token from the power source.

16. The apparatus of claim 12, wherein the processor is further configured to cause the combined power/data interface to provide a requested power level to the power source, wherein the power source provides the power for the apparatus in response to the authentication response.

17. The apparatus of claim 16, wherein the combined power/data interface is further configured to:
   receive a default power level for the apparatus before obtaining the authentication request; and
   receive the requested power level for the apparatus after providing the authentication response.

18. A system comprising:
   a power source configured to provide power to devices associated with at least one of a plurality of verified identities; and
   a computing device configured to:
      connect to the power source via a combined power/data connection;
      obtain an authentication request from the power source, the authentication request including a nonce provided by the power source;
      sign the nonce with a private key stored on the computing device to generate a signed nonce, the private key associated with a verified identity of the computing device;
      provide an authentication response including the signed nonce to the power source;
      receive power at the computing device from the power source; and
      obtain a reauthentication token from the power source, the reauthentication token authenticating the computing device with the verified identity for a subsequent connection of the computing device to the power source, wherein the reauthentication token is encrypted with a public key associated with the private key.

19. The system of claim 18, wherein the computing device is further configured to:
   detect that the combined power/data connection between the computing device and the power source is disconnected;
   reconnect the combined power/data connection between the computing device and the power source;
   provide the reauthentication token to the power source to enable the computing device to reauthenticate the verified identity to the power source; and
   receive power at the computing device from the power source over the combined power/data connection.

20. The system of claim 19, wherein the power source is configured to provide power to the computing device over the combined power/data connection after the combined power/data connection has been reconnected to the power source at a power level received that corresponds to a requested power level indicated in the authentication response.

21. The system of claim 19, wherein the computing device authenticates the power source before providing the reauthentication token to the power source.

22. The system of claim 21, wherein the computing device authenticates the power source by:
   obtaining a timestamp signed by a private key associated with the power source; and
   verifying the time stamp with a public key associated with the power source.

23. The system of claim 19, wherein a power level received over the combined power/data connection after it has been reconnected corresponds to a requested power level provided with the reauthentication token.

24. The system of claim 18, wherein the computing device is further configured to:
   establish a mutually authenticated secure communication channel between the computing device and the power source; and
   obtain a reauthentication token from the power source.

25. The system of claim 18, further comprising an authentication server in communication with the power source, the authentication server configured to authorize the verified identity associated with the computing device to receive power from the power source.

26. The system of claim 18, wherein the computing device determines a first amount of power consumed by the computing device during a predetermined time period, and provides to the power source an indication of the first amount of power.

* * * * *